Nov. 5, 1946.   D. W. PUGSLEY   2,410,745
SWEEP CIRCUIT
Filed Nov. 20, 1942

Inventor:
Donald W. Pugsley,
by Harry E. Dunham
His Attorney.

Patented Nov. 5, 1946

2,410,745

UNITED STATES PATENT OFFICE 2,410,745

SWEEP CIRCUIT

Donald W. Pugsley, Bridgeport, Conn., assignor to General Electric Company, a corporation of New York Application November 20, 1942, Serial No. 466,266

2 Claims. (Cl. 315—29)

The present invention relates to a sweep circuit producing sawtooth waves of adjustable slope for controlling the time scale of the trace of cathode ray tubes.

An object of my invention is to provide a sweep circuit producing a sawtooth wave having its slope adjustable without substantially affecting its amplitude so the length of the trace will not be affected by the change in slope.

Figure 1:
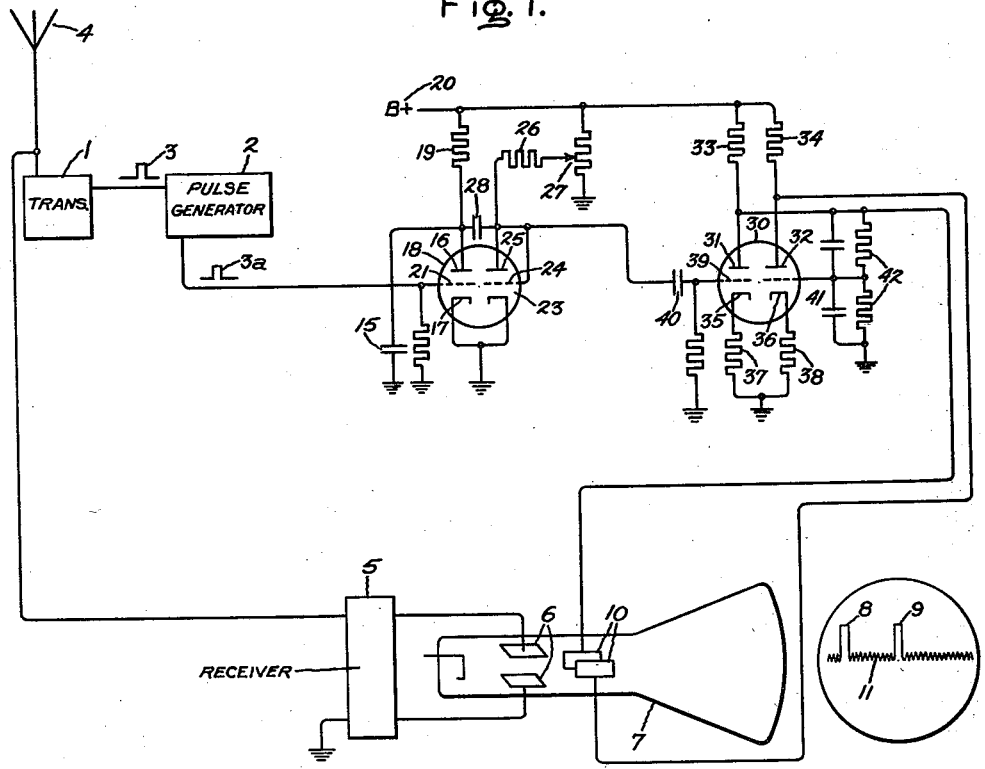

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 shows a sawtooth sweep circuit embodying my invention and Fig. 2 is a diagram explaining the operation.

Referring to the drawing, there is shown a sweep circuit embodying my invention applied to radio locating equipment having a transmitter 1 driven by a pulse generator 2 producing pulse voltages 3 which cause the transmission of corresponding pulses of radio waves at the desired repetition rate over an antenna 4 and pulse voltages 3a which, as hereinafter described control a sawtooth sweep circuit. Usually (though not necessarily) the pulses 3 are slightly later in time phase than the pulses 3a. The responses to the transmitted pulses, which may be reflections of the transmitted pulses or pulses from pulse transmission equipment carried by the object to be located and excited by the transmitted pulses, are conducted from the antenna through a receiver 5 to the vertical plates 6 of a cathode ray tube 7 and cause the vertical deflections 8 and 9 corresponding to the transmitted and received pulses.

The horizontal plates 10 of the cathode ray tube are connected to a sawtooth sweep circuit, causing a horizontal deflection or trace 11, which provides a linear time scale coordinating the transmitted and received pulses so that the distance between the deflections 8 and 9 provides a measure of the distance of the object to be located. The length and time scale of the trace 11 are respectively determined by the amplitude and slope of the sawtooth wave.

Figure 2:
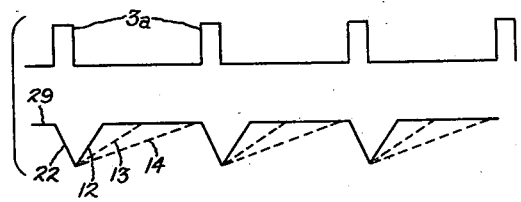

In order that the deflections 8 and 9 may be kept separated so that the distance may be more easily measured, it is desirable that the slope of the sawtooth wave be adjustable as indicated at 12, 13, and 14 in Fig. 2. The steeper slopes 12 and 13 are used for locating the nearer objects.

The sawtooth waves shown in Fig. 2 are obtained from the voltage on a condenser 15 connected across the anode 16 and cathode 17 of a tube 18 and in series with a charging resistance 19 connected to a power supply 20. The high and low sides of the condenser are respectively connected to the anode and cathode. The grid 21 of the tube 18 is connected to the pulse generator 2 which drives the grid positive during each of the pulses 3a, reducing the impedance of the tube and causing the discharge of the condenser 15 through the tube. The drop in condenser voltage during the pulses 3a, indicated at 22 in Fig. 2, is determined by the pulse width which is substantially constant. At the end of the pulses 3a the grid 21 returns to its normal potential and the condenser voltage builds up at a rate determined in part by the charging resistance 19. The rate of build-up of the charge of the condenser is also controlled by a tube 23 connected as a positively biased diode rectifier by having its grid 24 and anode 25 connected through a resistance 26 to a potentiometer 27 across the power supply. Being connected as a diode, the tube 23 becomes conducting at a definite voltage and is nonconducting below that voltage. The anodes 16 and 25 are connected by a coupling condenser 28 large enough to maintain a substantially constant voltage difference between the anodes.

Just before the pulses 3a the condenser 15 is charged to its maximum voltage, indicated at 29 in Fig. 2, the diode 23 is conducting, the anode 25 being at a small positive voltage due to the low internal resistance of the diode, and the coupling condenser 28 is charged to the difference in potential between the anodes 16 and 25. Since the coupling condenser 28 maintains a constant voltage difference between the anodes 16 and 25, the sawtooth waves of Fig. 2 represent the voltage of either anode. During the pulses 3a the grid 21 is driven positive, reducing the impedance of the tube 18 and causing the discharge of the condenser 15. As the condenser discharges, the voltage of the anode 16 becomes negative with respect to its maximum voltage 29, and, due to the coupling condenser 28 the anode 25 has a corresponding change in voltage. The pulsing of the grid 21 accordingly drives the anodes 16 and 25 negative for the duration of the pulses 3a. The negative driving of the anode 25 stops conduction through the diode 23. At the end of the pulses 3a the condenser 15 charges through the charging resistance 19 and also through the condenser 28 and the resistance 26 in series with the potentiometer 27. By moving the tap on the potentiometer up or down from the position illustrated, the rate of charge through the resistance 26 will be increased or decreased so as to vary the rate of recovery of the potential of the anodes 16 and 25. When the condenser 15 is charged to the voltage at which the diode 23 becomes conducting, further increase in the condenser voltage is prevented. Depending upon the setting of the potentiometer 27, the rate of recovery of the voltage of the condenser 15 may be varied as indicated at 12, 13, and 14 in Fig. 2. The most gradual slope 14 will provide a time scale for the trace permitting measurement of the interval between the deflections 8 and 9 up to the maximum range of the equipment. Steeper slopes, such as 12 and 13, will be used for shorter ranges.

The sawtooth wave appearing at the anode 25 is fed to the horizontal plates of the cathode ray tube 7 through a double triode amplifier tube 30 having anodes 31 and 32 connected to the power supply through resistances 33 and 34 and having cathodes 35 and 36 connected to cathode resistances 37 and 38. The grid 39 is connected through a coupling condenser 40 to the anode 25. The grid 41 is connected to a tap on a voltage divider 42 connected between the anode 31 and ground. As the grid 39 is driven negative from its maximum voltage, less current flows to the anode 31 and the voltage of the anode 31 rises, driving the grid 41 positive and causing a drop in the voltage of the anode 32. The difference between the voltages of the anodes 31 and 32 is applied to the horizontal plates 10 of the cathode ray tube producing the trace 11.

While I have shown a particular embodiment of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States is:

1. A saw-tooth sweep circuit comprising, a condenser to be charged to a saw-tooth voltage, a pair of charging resistances, one of the resistances being connected to the high side of the condenser and the other of the resistances being connected to the low side of the condenser through a rectifier and to the high side of said first condenser through a second condenser, said rectifier being poled to conduct at a predetermined charge, and to prevent further charging, of the first condenser, and keying means for periodically discharging said first condenser.

2. In equipment having a cathode ray tube utilizing a saw-tooth voltage for providing a time scale trace, a sweep circuit comprising a condenser to be charged to a saw-tooth voltage, a charging resistance for the condenser, said resistance being variable to vary the slope of the saw-tooth voltage, means for applying the condenser voltage to the cathode ray tube, means for periodically discharging the condenser, and means for limiting the amplitude of the condenser voltage to a value less than that which would be obtained prior to normal operation of said discharging means for some adjustments of said resistance whereby the time scale trace has an amplitude independent of the slope of saw-tooth voltage and a repetition rate determined by said discharging means.

DONALD W. PUGSLEY.